Jan. 12, 1965
H. SPAENIG ETAL     3,165,145
PROCESS FOR THE CONTROL OF THE TEMPERATURE IN REACTORS
BY THE INDIRECT EXCHANGE OF HEAT BY
MEANS OF WATER UNDER PRESSURE
Filed June 30, 1960
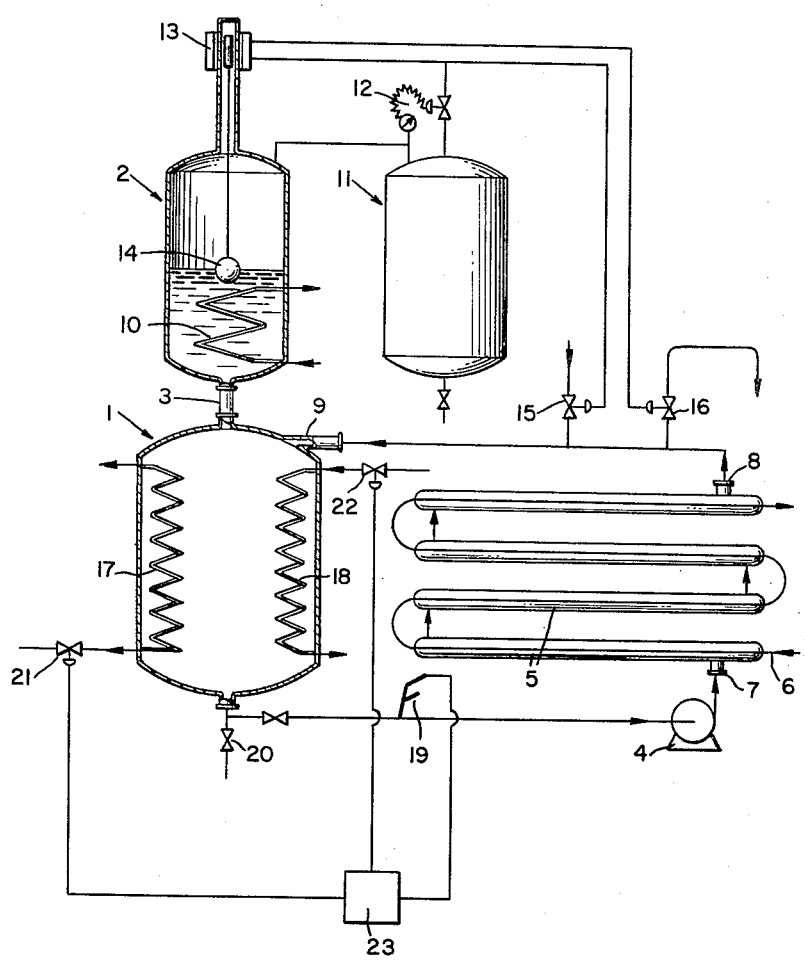
INVENTORS
HERMANN SPAENIG
GEORGE SCHMIDT-THOMEE
KURT WEIZSAECKER
BY *Margaee Johnston Cook & Root*
ATTORNEYS

United States Patent Office 3,165,145
Patented Jan. 12, 1965

3,165,145
PROCESS FOR THE CONTROL OF THE TEMPERATURE IN REACTORS BY THE INDIRECT EXCHANGE OF HEAT BY MEANS OF WATER UNDER PRESSURE
Hermann Spaenig, Ludwigshafen (Rhine), Georg Schmidt-Thomee, Heidelberg, and Kurt Weizsaecker, Mannheim, Germany, assignors to Badische Anilin- & Soda-Fabrik Aktiengesellschaft, Ludwigshafen (Rhine), Germany
Filed June 30, 1960, Ser. No. 39,988
Claims priority, application Germany, July 1, 1959, B 53,826
3 Claims. (Cl. 165—2)

This invention in general relates to a process for eliminating safely and efficiently the heat produced in reactors as a result of exothermic reactions. More specifically the invention relates to a process for preventing the occurrence of steam bubbles in reactors heated and cooled by water under pressure and to an apparatus therefor.

In many chemical processes it is necessary to keep the pressure container in which the reaction occurs at a constant temperature. For this purpose water is mainly used as the heating and cooling medium, even at temperatures above 100° C., especially when the gases and liquids to be reacted are readily inflammable. The disadvantage which attends this procedure is that the water must be introduced into the heating and cooling system of the reactor under pressure.

For example when working in a tubular reactor, the water having a temperature, for example, of 200° C., serves for heating up the substances to be reacted at the beginning of the reactor, but as a coolant in the middle and at the end of the reactor for eliminating the reaction heat. If the reaction is strongly exothermic, so that a large quantity of heat has to be withdrawn, good contact of the heating and cooling water with the reactor tubes is primarily required. For example if one of the heating and cooling jacket tubes of the reactor fills with steam because the saturation vapor pressure of the water is exceeded by reason of an excessive rise in temperature in the reactor, the reaction heat cannot all at once be any longer withdrawn. The consequence of this is a further rise in temperature in the reactor, a marked increase in the reaction speed and the initiation of undesirable, possibly explosive reactions.

In the operation of such reactors care must therefore be taken that the saturation vapor pressure of the heating and cooling water in the reactor must not be exceeded so that steam bubbles cannot prevent the withdrawal of heat. This may be achieved by setting up a certain air or nitrogen pressure in the hot water reservoir. Since, however, the water always dissolves a certain amount of nitrogen and this is moreover lost at leaky places of the pipe system, this known process is not reliable in operation. Another process comprises pumping water which is under its own vapor pressure in the hot water reservoir into the heating and cooling system by means of circulating pumps and passing it through a throttle after it leaves the reactor. By the combined action of the pumps and the throttle, the water in the heating and cooling system of the reactor remains at a pressure which is above its saturation vapor pressure. This technique also has disadvantages and is not economical because by the throttling makes the speed of the flow of water through the system decrease so that very strong pumps are required. Moreover a sudden failure of the pumps may result in steam bubble formation and consequently in a spontaneous rise of temperature in the reactor.

It is therefore necessary to maintain the pressure in the cooling system so high that the formation of steam bubbles at any point in the reactor is impossible.

The process in accordance with this invention has for its object to maintain the pressure in the system charged with hot pressurized water sufficiently high to heat and cool reactors, especially those having double walled tubes, in an efficient manner.

It is another object of this invention to provide for the pressure in the system charged with hot pressurized water to be controlled automatically and adjusted independently of the temperature in the reactor.

It is another object of this invention to maintain the pressure in the system charged with hot pressurized water higher than corresponds to the vaporization equilibrium pressure of the hot water.

It is another object of this invention to prevent as far as possible the absorption of gases in the system charged with hot water.

It is another object of this invention to maintain the level of liquid in the system charged with hot pressurized water automatically constant.

It is another object of this invention to remove immediately any steam bubbles formed in the system charged with hot pressurized water from the jacket space surrounding the reaction chamber and to condense them with colder liquid.

These and other details of our invention will be apparent from the following detailed description to be read with reference to the accompanying diagrammatic drawing. It is to be understood, however, that this embodiment of our invention is given only by way of example without limiting our invention thereto.

In accordance with this invention it is possible to prevent in a simple manner the formation of steam bubbles in a reactor jacket upon cooling with the heating water and to operate at a controllable pressure lying above the maximum attainable vapor pressure of the water which corresponds to the maximum reaction temperature. In contrast to the prior art processes, this is achieved in an especially simple way by cooling the water-column contained in a special auxiliary vessel in communication with the system charged with hot pressurized water to a temperature below the temperature of the circulating hot water and at the same time maintaining in the auxiliary vessel, by forcing in a gas cushion consisting of an inert gas, such as air or nitrogen, a pressure which is higher than the saturation vapor pressure which corresponds to the maximum possible temperature of the hot water. The hot water current is led only through the system charged with hot pressurized water and not through the auxiliary vessel. This is achieved by connecting the main vessel which contains hot water and is constructed to function as a thermostat, by means of a narrow pipe which diminishes convection, to an auxiliary vessel through which the hot water current does not flow. In the auxiliary vessel the static water-column is cooled to such an extent that its partial pressure does not change upon variations of the temperature in the reaction system. The water in the auxiliary vessel is then placed under so high a pressure of air or nitrogen that no steam bubbles can occur in the hot water cycle. It is necessary to dispose the auxiliary vessel above the main vessel and to connect the narrow connecting pipe to the highest point of the main vessel. If the main and auxiliary vessels are moreover accommodated at the highest point of the system charged with pressurized water; all air bubbles present in the system will rise into the auxiliary vessel. The nitrogen space will be chosen so large that changes in the volume of the water, for example upon heating, have only a negligible effect on the nitrogen. For this purpose, an additional nitrogen buffer is provided.

The process will now be described with reference to the accompanying drawing.

The heating and cooling aggregate comprises a main vessel 1 and an auxiliary vessel 2 connected together by a narrow pipe 3. A pump 4 continually sucks in water heated in the main vessel 1 and forces it into jacket tubes 5 of a reactor 6. Here the water serves at the inlet 7 to heat up the reaction mixture which flows through the reactor continuously, while it serves as a coolant in the middle and at the outlet 8 to eliminate the reaction heat. Thereafter the water flows back to the main vessel 1 being forced in tangentially through an inlet pipe 9. This completes the water cycle. The water in the lower part of the auxiliary vessel 2 is stationary and does not take part in the circulation. The stationary water present in the lower part of the auxiliary vessel 2 is continually cooled and kept at room temperature by a small cooling coil 10.

Into the upper part of the auxiliary vessel nitrogen at, for example, 30 atmospheres is forced in through a buffer vessel 11. This pressure is transmitted through the lower outlet 3 from the auxiliary vessel into the main vessel 1 and thence into the whole heating and cooling system. The buffer vessel 11 serves to increase the nitrogen cushion, the nitrogen pressure being maintained constant by an automatic regulator 12. In the auxiliary vessel 2 there is provided a magnetic level indicator 13 which indicates the level of the water by way of a float 14 and so controls a supply valve 15 in the case of losses of water in the heating and cooling system that water under pressure is forced into the system until the loss has been made good. If the level of water should become too high, the level indicator 13 regulates a drain valve 16 so that water is discharged until the normal level has been restored.

The main vessel 1, which is constructed to function as a thermostat, is provided with a cooling system 17 and a heating system 18; these are controlled according to requirement, for example by way of a thermo-couple 19, so that the water flowing from the main vessel 1 is introduced into the heating and cooling system with the desired constant temperature which can be regulated either by hand or by the reaction temperature. At the inlet to cooling system 17 there is placed a control valve 21, and at the inlet to the heating system 18 is placed a control valve 22. Control valves 21 and 22 are operated by controller 23 which receives its instructions from thermocouple 19. If the temperature of thermocouple 19 is too low, control valve 21 in cooling system 17 shuts off the cooling fluid. Control valve 22 in heating system 18 opens and allows steam or heating fluid to flow into the heating system. On the other hand, if the temperature in thermocouple 19 is too high, control valve 21 in cooling system 17 is opened and valve 22 in heating system 18 is closed. If the temperature at thermocouple 19 is within preselected limits, control valves 21 and 22 are closed. These valves may, if necessary, be adjusted by hand or through controller 23.

In the practice of our invention, for setting the heating and cooling aggregate in operation, water is fed into the main vessel 1 through a valve 20 from below until it is filled. The feed of water is continued until the auxiliary vessel 2 is also filled through pipe 3 up to the desired level. Then nitrogen is pressed into the auxiliary vessel 2 through the buffer vessel 11 until the water column is under the required pressure and the pump 4, the cooling coil 10 and the control aggregate for heating and cooling are switched on. After the reaction temperature has been reached, the substances to be reacted can be led through the reactor. The water in the auxiliary vessel 2 remains cold so that the water vapor partial pressure does not rise in the auxiliary vessel 2 when the main vessel is heated up.

The present invention provides an efficient method for using hot pressurized water as a heat-exchanging agent in chemical reactions while ensuring full safety in operation. This new method no longer has any of the shortcomings inherent in heating and cooling systems working with pressurized water, namely the formation of steam bubbles and the consequent poor transfer of heat at those parts of the reactor where the formation of steam bubbles occurs. A further advantage resides in the fact that no throttling means need any more be provided in the system and as a result no pumping work is necessary.

We claim:

1. A process for regulating the temperature in reactors by indirect heat exchange with pressurized water which comprises: circulating water from a full storage vessel through the external jacket of a reactor and back to said storage vessel; heating and cooling said water to a desired temperature within said storage vessel; maintaining a pressure in said storage vessel which is higher than the saturation vapor pressure corresponding to the maximum attainable temperature of the water in the circulating system, said pressure being maintained by forcing a gas cushion into an auxiliary vessel which is partially filled with water, said auxiliary vessel being arranged above said storage vessel and being connected to the highest point of said storage vessel by a narrow conduit, said narrow conduit being such that the water passing from said storage vessel through said reactor jacket does not circulate through said auxiliary vessel; and maintaining the water in said auxiliary vessel at a temperature lower than the temperature of the water in said storage vessel.

2. A process for regulating the temperature in reactors by indirect heat exchange with pressurized water which comprises: circulating water from a full storage vessel through the external jacket of a reactor and back to said storage vessel; heating and cooling said water to a desired temperature within said storage vessel; maintaining a pressure in said storage vessel which is higher than the saturation vapor pressure corresponding to the maximum attainable temperature of the water in the circulating system, said pressure being maintained by forcing a gas cushion into an auxiliary vessel which is partially filled with water, said auxiliary vessel being arranged above said storage vessel and being connected to the highest point of said storage vessel by a narrow conduit, said narrow conduit being such that the water passing from said storage vessel through said reactor jacket does not circulate through said auxiliary vessel; maintaining the water level in said auxiliary vessel constant by feeding and withdrawing water from said circulating system; and maintaining the water in said auxiliary vessel at a temperature lower than the temperature of the water in said storage vessel.

3. A process for regulating the temperature in reactors by indirect heat exchange with pressurized water which comprises: circulating water from a full storage vessel through the external jacket of a reactor and back to said storage vessel; heating and cooling said water to a desired temperature within said storage vessel; maintaining a pressure in said storage vessel which is higher than the saturation vapor pressure corresponding to the maximum attainable temperature of the water in the circulating system, said pressure being maintained by forcing a gas cushion from a buffer area into an auxiliary vessel which is partially filled with water, said auxiliary vessel being arranged above said storage vessel and being connected to the highest point of said storage vessel by a narrow conduit, said narrow conduit being such that the water passing from said storage vessel through said reactor jacket does not circulate through said auxiliary vessel; maintaining the water level in said auxiliary vessel constant by feeding and withdrawing water from said circulating system; and maintaining the water in said auxiliary vessel at a temperature lower than the temperature of the water in said storage vessel.

References Cited in the file of this patent

UNITED STATES PATENTS

| | | |
|---|---|---|
| 1,896,953 | Hassell | Feb. 7, 1933 |
| 2,355,564 | Sebald | Aug. 8, 1944 |
| 2,650,031 | Hitch et al. | Aug. 25, 1953 |
| 2,888,204 | Williams | May 26, 1959 |
| 2,893,701 | Bell | July 7, 1959 |
| 2,971,746 | Bell | Feb. 14, 1961 |

FOREIGN PATENTS

| | | |
|---|---|---|
| 590,705 | Canada | Jan. 12, 1960 |
| 592,656 | Canada | Feb. 16, 1960 |

OTHER REFERENCES

Publication: "International Conference of Peaceful Uses of Atomic Energy," August 1955, vol. 3, pages 211–226, United Nations Publication, New York.